United States Patent
Moser et al.

(10) Patent No.: US 8,525,672 B2
(45) Date of Patent: Sep. 3, 2013

(54) PASSIVE ENTRY AND/OR PASSIVE GO SYSTEM AND ASSOCIATED OPERATING METHOD

(75) Inventors: Daniel Moser, Stuttgart (DE); Helmut Moser, Heilbronn (DE)

(73) Assignee: Atmel Corporation, San Jose, CA (US)

( * ) Notice: Subject to any disclaimer, the term of this patent is extended or adjusted under 35 U.S.C. 154(b) by 1332 days.

(21) Appl. No.: 11/790,493

(22) Filed: Apr. 25, 2007

(65) Prior Publication Data

US 2007/0257771 A1    Nov. 8, 2007

Related U.S. Application Data

(60) Provisional application No. 60/801,402, filed on May 19, 2006.

(30) Foreign Application Priority Data

Apr. 25, 2006    (DE) .......................... 10 2006 020 422

(51) Int. Cl.
*G08B 1/08*    (2006.01)
*H04B 5/00*    (2006.01)
*H04B 17/00*    (2006.01)

(52) U.S. Cl.
USPC .................. 340/539.21; 455/226.2; 455/41.1; 340/539.13

(58) Field of Classification Search
USPC ............................ 340/5.61; 455/456.1, 572.1
See application file for complete search history.

(56) References Cited

U.S. PATENT DOCUMENTS

| 2,489,908 | A | * | 11/1949 | Larrick ............................ 343/703 |
| 6,903,662 | B2 | * | 6/2005 | Rix et al. ............................ 341/22 |
| 6,922,553 | B2 | * | 7/2005 | Blatz et al. .................. 455/226.2 |
| 6,924,738 | B2 | | 8/2005 | Emmerling et al. |
| 7,034,656 | B2 | | 4/2006 | Buchner |
| 2001/0033222 | A1 | * | 10/2001 | Nowottnick et al. ......... 340/5.61 |
| 2003/0071717 | A1 | * | 4/2003 | Hagl et al. .................... 340/5.61 |

(Continued)

FOREIGN PATENT DOCUMENTS

DE    199 41 351 A1    3/2001
DE    100 32 936 A1    2/2002

(Continued)

OTHER PUBLICATIONS

"Signal Strength." http://en.wikipedia.org/wiki/Signal_Strength. Retrieved Jun. 7, 2012.*

(Continued)

*Primary Examiner* — Steven Lim
*Assistant Examiner* — Pameshanand Mahase
(74) *Attorney, Agent, or Firm* — Baker Botts LLP

(57) ABSTRACT

A passive entry and/or passive go system and am associated operating method is provided. According to an embodiment of the invention, the following steps are performed in an electronic key of the passive entry and/or passive go system: generation of a reference input value, supplying the antenna circuit with the reference input value, measurement of the characteristic parameters, while the antenna circuit is supplied with the reference input value, storage of the characteristic parameters, measurement of a first output value of the antenna circuit, and determination of the field strength from the first output value and the characteristic parameters, whereby an effect of the characteristic parameters on the field strength is compensated. Use, for example, in motor vehicles.

23 Claims, 2 Drawing Sheets

(56) References Cited

U.S. PATENT DOCUMENTS

| | | | |
|---|---|---|---|
| 2004/0145491 A1* | 7/2004 | Nascimento | 340/825.72 |
| 2004/0217850 A1* | 11/2004 | Perttunen et al. | 340/426.17 |
| 2005/0246094 A1* | 11/2005 | Moscatiello | 701/207 |
| 2006/0073857 A1* | 4/2006 | Hanabusa et al. | 455/572 |
| 2006/0114100 A1* | 6/2006 | Ghabra et al. | 340/5.61 |

FOREIGN PATENT DOCUMENTS

| | | |
|---|---|---|
| DE | 100 46 897 A1 | 10/2002 |
| DE | 101 59 551 A1 | 6/2003 |
| DE | 102 21 427 A1 | 12/2003 |
| EP | 1 189 306 A1 | 3/2002 |
| WO | WO-01/89887 A1 | 11/2001 |

OTHER PUBLICATIONS

Finkenzeller, K., "RFID-Handbuch [RFID Manual]", $3^{rd}$ Edition, Hanser, 2002, pp. 40-45, 72-73 and 77, 103-104.
ATMEL, "Wireless Control Systems", Data Book 2001, ICs, p. 326.
German Office Action and English Translation Re; U.S. Appl. No. 60/801402 for counterpart German application DE 102006020422.0-51, our file P000282/US/2, Request for Examination Apr. 25, 2006.
PCT—*Notification of Transmittal of the International Search Report and the Written Opinion of the Int'l Searching Authority, or the Declaration,* for In'l Appl. No. PCT/EP2007/003621, Int'l filed Apr. 25, 2007, and English Translation of Written Opinion of the International Searching Authority Jun. 8, 2007.

* cited by examiner

PASSIVE ENTRY AND/OR PASSIVE GO SYSTEM AND ASSOCIATED OPERATING METHOD

This nonprovisional application claims priority to German Patent Application No. DE 102006020422, which was filed in Germany on Apr. 26, 2006, to U.S. Provisional Application No. 60/801,402, which was filed on May 19, 2006, and which are both herein incorporated by reference.

BACKGROUND OF THE INVENTION

1. Field of the Invention

The present invention relates to a method for operating a passive entry and/or a passive go system and to a passive entry and/or passive go system.

2. Description of the Background Art

In so-called remote keyless entry systems for motor vehicles, an unlocking of the vehicle occurs not with a mechanical key, but with an electronic key medium or an electronic key, for example, in the shape of a molded article, on which actuation elements are arranged. One or more integrated circuits, which realize the function of the electronic key medium or of the electronic key, are arranged on or in the key medium.

A so-called base station, which communicates or exchanges data with the electronic key in a wireless manner, is placed in the motor vehicle as a counterpart to the electronic key.

To unlock or lock the motor vehicle, a user actuates an associated control element on the electronic key, as a result of which a data transmission is initiated between the electronic key or its integrated circuit and the base station.

If the information transmitted between the base station and the electronic key corresponds to a stipulated protocol and has the expected content, the motor vehicle is unlocked with the aid of the base station.

In so-called passive entry/passive go systems or passive entry go (PEG) systems, actuation of the key to lock or unlock the motor vehicle is no longer necessary. The user of the motor vehicle must only keep an electronic key medium with him, for example, such as a card.

When the user operates a door handle of the motor vehicle, this is detected in the motor vehicle and reported to the base station. The base station thereupon transmits a low-frequency carrier signal, for example, with a frequency of 125 kHz, to the electronic key medium. In addition, data may also be transmitted to the electronic key medium by the low-frequency carrier signal.

To receive the low-frequency carrier signal, the key medium has an antenna circuit with an antenna, for example, in the form of a coil, whereby the antenna circuit generates an output value, for example, a voltage, which is a function of the field strength and a function of characteristic parameters of the antenna circuit.

An exemplary circuit arrangement for obtaining field strength information or for determining the field strength is described in German Patent Application DE 101 59 551 A1, which corresponds to U.S. Pat. No. 6,922,553, and which is incorporated herein by reference.

The output value is used to determine the distance of the key medium from the base station or from one or more transmitting antennas. If more than one transmitting antenna is provided at different positions, for example, in a front area and in a back area, of the motor vehicle, the position of the user or the key medium relative to the motor vehicle can also be determined by triangulation based on two determined distances from the particular antennas.

To determine the field strength independent of an orientation or position of the key medium relative to the transmitting antenna of the base station, devices are known in which three antenna coils, each perpendicular to one another, are provided. The specific field strengths of the antenna coils are vectorially superposed to calculate a resulting field strength.

When the distance between the antenna of the base station and the antenna of the key medium antenna circuit has been determined, it is then verified whether the determined distance lies within a permitted tolerance range. If this is the case, access to the motor vehicle is made possible by unlocking all or only certain locks. The unlocking of only certain locks can be made dependent on the position of the user relative to the motor vehicle.

If the user then enters the motor vehicle and operates a start button to start the engine, a distance or position determination is performed in the key medium also based on a field strength measurement. If the position determination indicates that the user is in the required position for starting the engine, the engine is started.

Apart from the access control and the engine start, there are numerous other application scenarios in which a distance measurement is made, for example, when the user climbs out of the motor vehicle and moves away from it.

It becomes clear from the above statements that there are high requirements for the distance or position measurement based on field strength determination of the carrier signal in the key medium.

As stated above, for the distance measurement by the antenna circuit, an output value is generated, for example, an output voltage, which is a function of the field strength and a function of the characteristic parameters of the antenna circuit. The characteristic parameters of a particular antenna circuit represent the tolerances, production variations, and other specific properties of the components of the particular antenna circuit.

Because each antenna circuit has its specific characteristic parameters, which can deviate considerably from one another in practice, different antenna circuit output voltages result in different antenna circuits at identical field strength. If, for example, an atypical table is provided in the particular key medium for distance calculation, in which an assignment of the output voltage to field strength is stored, this can lead to obvious errors in the distance calculation.

In order to take this problem into account, a laborious calibration of the key media or the antenna circuits usually takes place during a manufacturing process. For this purpose, for example, a known reference field strength can be predefined from outside by a calibration station, which is used to generate a calibration value in the particular key medium. This method is very laborious and takes into account only the parameter situation during the calibration process. A change in the characteristic parameters by long-term effects, temperature, and variable operating voltage cannot be detected by calibration during the manufacturing process; i.e., the distance measurement becomes accordingly poorer with such long-term effects.

Another major problem is that the antenna circuit or its antenna is more greatly dampened depending on metallic objects in its environment, for example, a bunch of keys. As a result, its characteristic parameters are also substantially changed depending on the situation. These effects as well cannot be detected by calibration during the manufacturing process.

SUMMARY OF THE INVENTION

It is therefore an object of the present invention to provide a method for operating a passive entry and/or a passive go system, as well as a passive entry and/or passive go system, which enable a precise, long-term stable field strength measurement, without requiring a laborious calibration during the manufacturing process.

In the method for operating a passive entry and/or a passive go system, the system has a base station for placement in a motor vehicle and at least one electronic key assigned to the base station, whereby a carrier signal is generated by the base station and the carrier signal is received at least at one antenna of an antenna circuit of the electronic key. The antenna circuit generates an output value, which is a function of the field strength of the carrier signal and a function of characteristic parameters of the antenna circuit. In the electronic key, a distance between the base station and the electronic key is determined from the field strength and system functions are carried out depending on the determined distance. According to the invention, the antenna circuit of the electronic key generates an output value, which is a function of the field strength and a function of characteristic parameters of the antenna circuit. The characteristic parameters of a particular antenna circuit represent the tolerances, production variations, and other specific properties of the components of the particular antenna circuit. According to the invention, the characteristic parameters are measured in the electronic key based on a reference input value generated within the electronic key itself; here, the antenna circuit during the measurement of the characteristic parameters is supplied with the reference input value, i.e., the reference input value serves as the input value of the antenna circuit during the measurement. Then, the characteristic parameters are saved. After this, a first, field-induced output value of the antenna circuit is measured, the antenna circuit not being supplied with the reference input value during the measurement of the first output value. The field strength is determined from the first output value and the characteristic parameters, an effect of the characteristic parameters on the field strength being compensated. The measurement of the characteristic parameters can occur in a cyclic manner, as a result of which a continuous calibration of the antenna circuit can occur. The generation of the in-circuit reference input value enables a calibration also without a laborious calibration process during manufacture. Because the calibration can take place continuously, a precise, long-time stable field strength measurement is possible, which also takes into account changed conditions in the surroundings, for example, metallic objects in the vicinity of the key medium or of the antenna circuit.

In an embodiment, the functions of the system comprise an unlocking, a locking, and/or starting of the motor vehicle as a function of the determined distance.

In an embodiment, the reference input value is generated in the form of a reference input voltage and/or a reference input current with a predefined reference frequency and reference amplitude. A second output value is measured with an applied reference input value, and the characteristic parameters are determined from the second output value. The characteristic parameters can be identical to the second output value or the second output value can be a measure for the characteristic parameters. Preferably, to determine the field strength, the quotient is formed from the first, field-strength-determined output value and the second, reference input value-determined output value.

In another embodiment, the reference frequency can be set equal to a frequency of the carrier signal. In this way, the characteristic parameters are determined by the reference value at the appropriate operating frequency.

In an embodiment, the reference frequency can be derived from a frequency of the carrier signal. It can be assured in this way that the calibration takes place by means of the reference input value also at the actual operating frequency of the antenna circuit.

In an embodiment, a distance between the antenna and a transmitting antenna of a transmitter of the carrier signal can be determined from the determined field strength. Preferably, within the context of the distance determination, the field strength is determined in addition at a second antenna and at a third antenna of the antenna circuit, whereby the antennas are each perpendicular to one another and a distance between the antennas and a transmitting antenna of a transmitter of the carrier signal is determined from the determined field strengths by superposition. By vectorial superposition of the field strengths calculated per antenna, it is possible to calculate the distance independent of an orientation of the antennas or of the key medium relative to the transmitting antenna.

In an embodiment, the antenna and a transmitting antenna of a transmitter of the carrier signal are mutually coupled. For mutual or inductive coupling, reference is made to the manual of Klaus Finkenzeller, RFID-Handbuch [RFID Manual], 3rd ed., HANSER, 2002; see in particular Chapter 3.2.1 "Inductive Coupling", pages 42 to 45.

In an embodiment, a parallel resonant circuit or a series resonant circuit is formed by the antenna circuit.

Also, the frequency of the carrier signal can be within a range of 50 KHz to 150 KHz or within a range of 5 MHz to 25 MHz.

The passive entry and/or passive go system of the invention comprises a base station for placement in a motor vehicle, at least one electronic key, which is assigned to the base station, and at least one antenna circuit, assigned to the key medium, with at least one antenna and an output terminal, at which an output value is applied in the form of an output voltage and/or an output current, which is a function of the field strength and a function of characteristic parameters of the antenna circuit. According to the invention, the electronic key has: a reference input value generating unit for generating a reference input value in the form of a reference input voltage and/or a reference input current with a known reference frequency and reference amplitude and an activatable switching unit, coupled to the antenna circuit and the reference input value generating unit, is provided, which supplies the antenna circuit with the reference input value as a function of the drive state or decouples the antenna circuit from the reference input value.

In an embodiment, the reference input value generating unit can be an oscillator. The oscillator may comprise, for example, a PLL, quartzes, voltage-controlled oscillators, etc.

In an embodiment, the system may further comprise an evaluation unit, which is determined in such a way that it evaluates an output value when a reference input value is not applied and an output value when a reference input value is applied for determining the field strength. The evaluation unit may be, for example, a microcontroller with a low power requirement.

In another embodiment, the antenna circuit can have an antenna coil and a capacitor, which together form a parallel resonant circuit.

In an embodiment, the switching unit can have a first switch, which is looped between a terminal of the capacitor and a reference potential, particularly ground, and a second switch, which is looped between the terminal of the capacitor and a terminal of the reference input value generating unit, at which the reference input value is applied. The switches are activated in such a way that the reference input value serves as an input value of the antenna circuit, when the characteristic parameters are determined, and that the antenna circuit is decoupled from the reference input value or the reference input value generating unit, when the field strength is measured.

In another embodiment, the antenna circuit can be designed for a mutual coupling with a transmitting antenna of a transmitter of the carrier signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
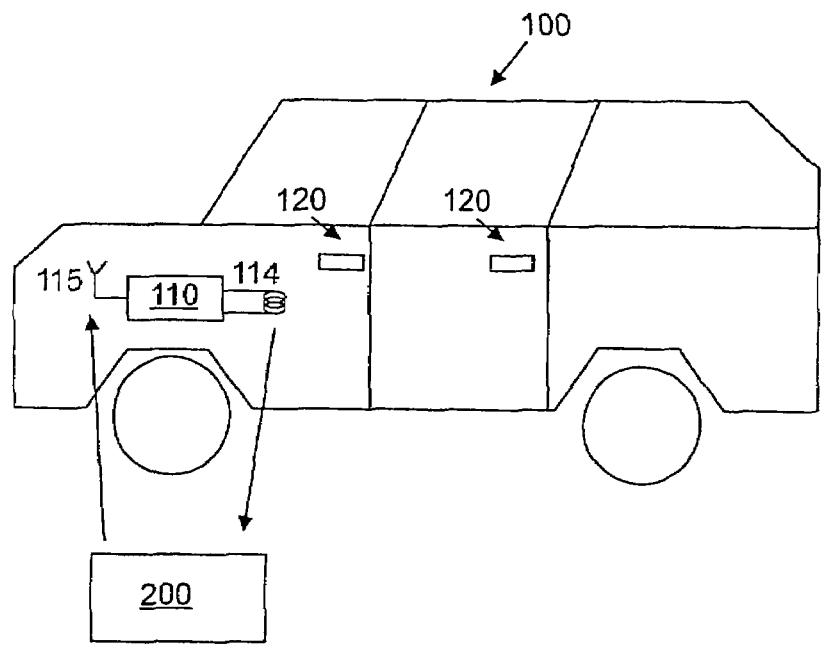
FIG. 1 illustrates a block diagram of a passive entry/passive go system for automatic, distance-dependent unlocking and/or locking and for keyless starting of a motor vehicle.

FIG. 1 shows a block diagram of a passive entry/passive go (PEG) system for automatic, distance-dependent unlocking and/or locking and for keyless starting of a motor vehicle 100.

The PEG system comprises a base station 110, which is placed in motor vehicle 100, and at least one card-shaped, electronic key medium 200 assigned to base station 110.

If a user (not shown) of key medium 200 operates a door handle 120 of motor vehicle 100, this is detected in motor vehicle 100 and reported to base station 110, for example, via a motor vehicle bus system (not shown). Base station 110 thereupon transmits a low-frequency (LF) carrier signal with a frequency of 125 kHz over an LF antenna of base station 110 in the form of a coil 114 to electronic key medium 200. Key medium 200, after receiving the LF carrier signal and a distance determination using the LF carrier signal field strength calculated in the key medium 200, transmits a signal with unlocking information in a UHF frequency range to base station 110, when the determined or calculated distance is within a permissible range. The UHF signal is received by a UHF antenna 115 of base station 110, and when the information transmitted from key medium 200 to base station 110 conforms with the protocol, motor vehicle 100 is unlocked, and the user can sit, for example, on a driver's seat (not shown) of motor vehicle 100.

To start motor vehicle 100, the user presses a start button, whereupon the low-frequency LF carrier signal is again transmitted to key medium 200. After a repeated distance or position calculation in key medium 200, during which it is verified whether the user is sitting in a driver's seat (not shown), a start release is transmitted by key medium 200, again via the UHF channel, to base station 110.

The UHF transmission is based on a far-field coupling and the LF transmission on an inductive or mutual coupling in the near field. If more than one antenna 114 is placed at different positions in motor vehicle 100, apart from a distance measurement, a position measurement relative to motor vehicle 100 can also be made by determining the respective antenna field strength, calculation of the distance to the respective antenna from the field strength, and subsequent triangulation.

Figure 2:
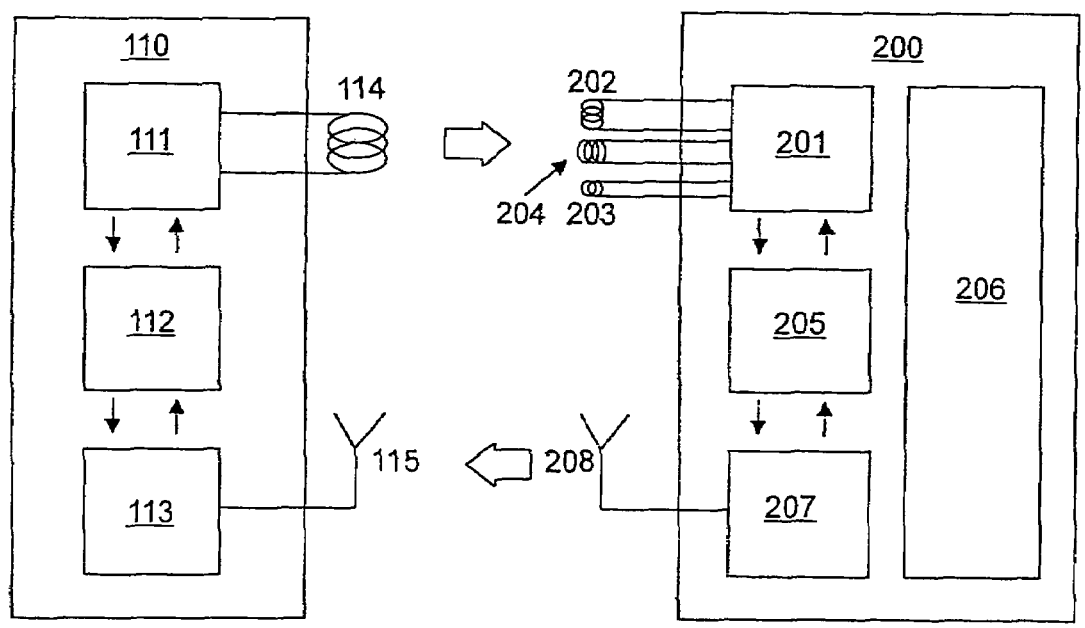
FIG. 2 illustrates a detailed block diagram of a key medium and a base station of FIG. 1.

FIG. 2 shows a detailed block diagram of key medium 200 and base station 110 of FIG. 1.

Base station 110 comprises an LF transmitter/receiver 111 and LF antenna 114 in the form of a coil, connected to LF transmitter/receiver 111, a UHF transmitter/receiver 113, a UHF antenna 115, connected to UHF transmitter/receiver 113, and a microprocessor 112, which is coupled to LF transmitter/receiver 111 and UHF transmitter/receiver 113 and exchanges data, to be transmitted and received bidirectionally, with the transmitter/receiver.

Key medium 200 comprises an LF transmitter/receiver 201 for a 3D reception, to which antennas 202, 203, and 204 are connected in the form of coils. The antenna coils or symmetry axes in the winding direction of antenna coils 202, 203, and 204 are each perpendicular to one another. The field strengths calculated per antenna can be interpreted as components of a three-dimensional field strength vector, whose contribution has a value dependent on the distance of key medium 200 from transmitting antenna 114 of base station 110, but the value is independent of an orientation of key medium 200 relative to transmitting antenna 114.

For UHF transmission, key medium 200 has a UHF transmitter/receiver 207 and a UHF antenna 208 connected to UHF transmitter/receiver 207.

Furthermore, key medium 200 has a microprocessor 205, which is coupled to LF transmitter/receiver 201 and UHF transmitter/receiver 207 and exchanges data, to be transmitted and received bidirectionally, with the transmitters/receivers, and a battery or an accumulator 206 for supplying power. LF transmitter/receiver 201 in addition outputs a field strength signal, associated with each of antennas 202, 203, and 204, to microprocessor 205.

In the simplest case, an LF data transmission occurs unidirectionally from base station 110 to key medium 200, whereby in this case, unit 111 is only a transmitter and unit 201 only a receiver. Accordingly, the UHF data transmission can occur unidirectionally from key medium 200 to base station 110, whereby in this case, unit 207 is only a transmitter and unit 113 only a receiver. In the shown exemplary embodiment, both the LF data transmission and the UHF data transmission occur bidirectionally.

Figure 3:
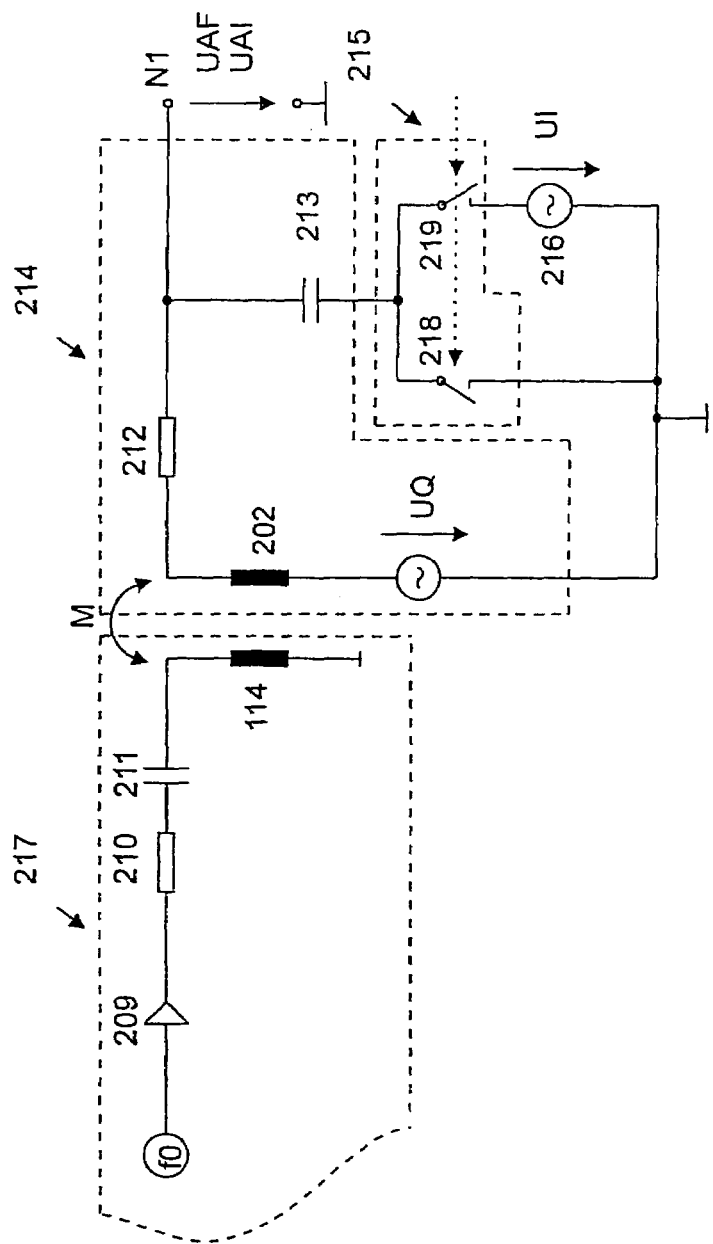
FIG. 3 illustrates a detailed block diagram of an antenna circuit of an LF transmitter/receiver of FIG. 2.

FIG. 3 shows a detailed block diagram of an antenna circuit 214 of LF transmitter/receiver 201 of FIG. 2. For reasons of clarity, only the antenna circuit which is assigned to antenna 202 is shown in FIG. 3. Antennas 203 and 204 are assigned corresponding antenna circuits (not shown).

Antenna circuit 214 comprises antenna or antenna coil 202, a resistor 212, which represents a parasitic copper resistor of antenna coil 202, and a capacitor 213. Antenna coil 202 and capacitor 213 form a parallel resonant circuit. An output value, which during normal operation is a function of the field strength of the LF carrier signal and a function of characteristic parameters of antenna circuit 214, is applied at the output terminal N1 in the form of an output voltage UAF or UAI. The output voltage UAF or UAI is used as an analog input value for an A/D converter (not shown) of microprocessor 205 and is processed further digitalized in said microprocessor.

The operation of the arrangement shown in FIG. 3 will be described in detail next. In a transmission unit 217 of base station 110, which is shown only as a detail, a signal with a frequency f0 is provided via a driver stage 209. The signal is supplied to a series resonant circuit with transmitting antenna coil 114, a resistor 210, and a capacitor 211. A voltage UQ is induced in antenna coil 202 by a magnetic carrier field generated in transmitting antenna coil 114. The following formulas describe in mathematic terms the coupling between antenna coils 114 and 202. They are derived from the manual Klaus Finkenzeller, RFID-Handbuch [RFID Manual], 3rd ed., HANSER, 2002; see particularly pages 72, 73, and 77.

$$UQ = \omega_0 * k\sqrt{L1 * L2} * i_1 \quad (1)$$

In Equation (1), UQ designates a voltage induced in coil 202; $\omega_0$ is the angular frequency assigned to the transmission frequency f0, k is a coupling factor, L1 is an inductance of antenna coil 114, L2 is an inductance of antenna coil 202, and $i_1$ is a current through transmitting antenna coil 114.

The voltage UQ induced in antenna coil 202 generates the following output voltage UAF:

$$UAF = \frac{UQ}{\sqrt{(\omega_0 * R2 * C2)^2 + (1 - \omega_0^2 * L2 * C2)^2}} \quad (2)$$

Equation (2), in comparison with the formula in Finkenzeller, contains the simplified assumption that RL=∞, as a result of which a term with RL is eliminated in the denominator. R2 designates a resistance value of resistor 212 and C2 designates a capacitance of capacitor 213.

Equation (2) shows directly that the output voltage UAF, produced by the field of the carrier signal, is determined by the value R2 of resistor 212, the inductance L2 of receiving coil 202, and the capacitance C2 of capacitor 213. These values therefore form the characteristic parameters of antenna circuit 214.

To determine the characteristic parameters or a measure for the characteristic parameters or a characteristic quantity for the characteristic parameters, which represents their output voltage-relevant properties, antenna circuit 214 is supplied with a reference input value. The reference input value is generated in the form of a reference input voltage UI by a reference input value generating unit in the form of an oscillator 216, which is part of LF transmitter/receiver 201 of FIG. 2. The frequency of the reference input voltage UI is the same as frequency f0 of the carrier signal. The amplitude of the reference input voltage UI is generated precisely with a previously known value.

For measuring the characteristic parameters, a switching unit 215, activated by microprocessor 205, with a first switch 218 and a second switch 219, is activated in such a way that switch 218 is opened and switch 219 is closed. This has the result that antenna circuit 214 is supplied with the reference input value UI as a simulated input voltage. The signal generated by transmitting unit 217 is turned off during the measurement of the characteristic parameters, i.e., UQ=0. Switching unit 215 is part of LF transmitter/receiver 201 of FIG. 2.

An output voltage UAF arising at output terminal N1 of antenna circuit 214 can be calculated using the following equation:

$$UAF = \frac{UI}{\sqrt{(\omega_0 * R2 * C2)^2 + (1 - \omega_0^2 * L2 * C2)^2}} \quad (3)$$

If a quotient is formed from the first output value UAF and the second output value UAI, the following equation results:

$$\frac{UAF}{UAI} = \frac{\frac{UQ}{\sqrt{(\omega_0 * R2 * C2)^2 + (1 - \omega_0^2 * L2 * C2)^2}}}{\frac{UI}{\sqrt{(\omega_0 * R2 * C2)^2 + (1 - \omega_0^2 * L2 * C2)^2}}} = \frac{UQ}{UI} \quad (4)$$

If Equation (4) is solved for UQ, we obtain:

$$UQ = UI * \frac{UAF}{UAI} \quad (5)$$

A distance x of the transmitting antenna or transmitting coil 114 of receiving antenna or receiving coil 202 can be calculated from the calculated voltage UQ using the following Equation (6):

$$x = \sqrt{\left(\sqrt[3]{\frac{r_{L2}^2 * r_{L1}^2}{2 * \sqrt{r_{L2} * r_{L1}} * \frac{UQ}{\omega_0 * \sqrt{L1 * L2} * i_1}}}\right)^2 - r_{L2}^2} \quad (6)$$

where $r_{L1}$ is a radius of transmitting antenna coil 114 and $r_{L2}$ a radius of receiving antenna coil 202. Equation (6) applies to air coils as transmitting antenna 114 and receiving antenna 202. If no air coils are used, Equation (6) can be modified accordingly. For this purpose, the coupling factor dependent on the distance x (by transformation of Equation (1))

$$k(x) = \frac{UQ}{\omega_0 * \sqrt{L1 * L2} * i_1}$$

in Equation (6) is to be replaced by a coupling factor valid for an employed coil type. For this purpose, reference is again made, for example, to Finkenzeller, see particularly page 108, or the data book: ATMEL, Data Book 2001, ICs for wireless control systems, pages 326ff.

In summary, the field strength or the distance is determined as follows:

In a first step, switching unit 215 is activated by microprocessor 205 such that antenna circuit 214 is supplied with the reference input value UI. The reference input value UI can be permanently active or activated solely for the measuring process. Here, it should be known or made certain that the carrier signal is not active.

Next, the arising output voltage UAI is measured and stored.

After storage of output voltage UAI generated by turning on reference voltage source 216, switching unit 215 is activated by microprocessor 205 in such a way that antenna circuit 214 is decoupled from the reference input value UI. The now arising output voltage UAF is produced by the field of the carrier signal at antenna coil 202.

The actual field strength, i.e., the field strength at which an effect of the characteristic parameters is compensated, is calculated by forming the ratio of UAF and UAI and multiplying by the known voltage UI.

For the final distance measurement, the specific field strengths, determined as described above, of antennas 202, 203, and 204 are superposed for calculating a total field strength, which is independent of the orientation. The distance is finally calculated using Equation (6) from the total field strength calculated by conventional vector calculus.

The measurement of the voltage UAI can be measured cyclically or triggered by certain events, as a result of which a change in the characteristic parameters of the antenna circuit, for example, due to a temperature drift, is taken into account.

It is understood that a current may also be used instead of the reference input value in the form of the voltage UI. For this purpose, switch 218 must remain closed in switching unit 215 during the measurement of the characteristic parameters and a reference current source supplies its current to a connection node between resistor 212 and capacitor 213.

In LF transmitter/receiver 201 of FIG. 2, other circuit parts can be provided in addition to antenna circuit 214. For example, an integrated circuit can be provided, which is designed for coupling to antenna circuit 214. The integrated circuit can then take over, for example, the evaluation of the output voltage UAF or UAI instead of microprocessor 205. In other words, the entire evaluation of the output voltage UAI and UAF occurs in the integrated circuit, as a result of which the evaluation in microprocessor 205 is simplified, because specific information is no longer necessary there. Furthermore, switching unit 215 and reference input value generating unit 216 can also be part of the integrated circuit.

The shown embodiments enable a precise, long-term stable field strength or distance measurement, without a laborious calibration being necessary during a manufacturing process.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method comprising:
receiving a carrier signal associated with a base station using an antenna of an antenna circuit of an electronic key;
calibrating, at the electronic key, an output value output from the antenna circuit by measuring characteristic parameters of the antenna circuit using a reference input value generated by the electronic key as an input to the antenna circuit;
calculating, at the electronic key, an actual field strength of the carrier signal using the calibrated output value;
determining, at the electronic key, a distance between the base station and the electronic key based on the actual field strength; and
transmitting, at the electronic key and based on a determination that the distance between the base station and the electronic key is within a pre-specified range, a signal to the base station, receipt of the signal at the base station causing the base station to initiate a function performed by an apparatus.

2. The method of claim 1, further comprising determining, at the electronic key, the function performed by the apparatus based on the distance.

3. The method of claim 1, wherein calculating the actual field strength further comprises calculating a quotient formed from the output value output from the antenna circuit and an output value resulting from the reference input value being used as the input to the antenna circuit.

4. The method of claim 1, wherein:
the reference input value comprises a reference voltage; and
calibrating the output value output from the antenna circuit further comprises generating, at the electronic key, the reference voltage at a reference frequency derived from a frequency of the carrier signal, the generating of the reference voltage being performed by an oscillator of the electronic key.

5. The method of claim 1, wherein:
the antenna is one of a plurality of perpendicular antennas of the electronic key; and
the method further comprises:
calculating, for each of the other antennas in the plurality of antennas, a corresponding actual field strength of the carrier signal; and
determining, at the electronic key, a position of the electronic key relative to the base station through superposition of the actual field strength for the antenna and the corresponding actual field strengths for each of the other antennas in the plurality of antennas.

6. An electronic key comprising:
an antenna circuit operable to receive using an antenna a carrier signal associated with a base station; and
one or more non-transitory computer-readable storage media that embody logic that is operable when executed to:
calibrate an output value output from the antenna circuit by measuring characteristic parameters of the antenna circuit using a reference input value generated by the electronic key as an input to the antenna circuit;
calculate an actual field strength of the carrier signal using the calibrated output value;
determine a distance between the base station and the electronic key based on the actual field strength; and
transmit, based on a determination that the distance between the base station and the electronic key is within a pre-specified range, a signal to the base station, receipt of the signal at the base station causing the base station to initiate a function performed by an apparatus.

7. The electronic key of claim 6, wherein:
the electronic key further comprises an oscillator;
the reference input value comprises a reference voltage; and
the logic when executed is further operable to generate the reference voltage at a frequency derived from a frequency of the carrier signal, the generating of the reference voltage being performed by the oscillator of the electronic key.

8. The electronic key of claim 6, wherein the logic when executed is operable to calculate the actual field strength of the carrier signal by performing operations comprising calculating a quotient formed from the output value output from the antenna circuit and an output value resulting from the reference input value being used as the input to the antenna circuit.

9. The electronic key of claim 6, wherein the logic when executed is further operable to determine the function performed by the apparatus based on the distance between the base station and the electronic key.

10. The electronic key of claim 6, wherein:
the antenna is one of a plurality of perpendicular antennas of the electronic key; and
the logic when executed is further operable to:
calculate, for each of the other antennas in the plurality of antennas, a corresponding actual field strength of the carrier signal; and
determine a position of the electronic key relative to the base station through superposition of the actual field strength for the antenna and the corresponding actual field strengths for each of the other antennas in the plurality of antennas.

11. The electronic key of claim 6, wherein the logic is further operable to switch between providing the reference input value and receiving the output value at the antenna circuit.

12. The electronic key of claim 6, wherein the function initiated by the base station is unlocking a motor vehicle.

13. One or more non-transitory computer-readable storage media that embody logic that is operable when executed to:
calibrate an output value output from an antenna circuit of an electronic key by measuring characteristic parameters of the antenna circuit using a reference input value generated by the electronic key as an input to the antenna circuit, the antenna circuit having received using an antenna a carrier signal associated with a base station;
calculate an actual field strength of the carrier signal using the calibrated output value;
determine a distance between the base station and the electronic key based on the actual field strength; and
transmit, based on a determination that the distance between the base station and the electronic key is within a pre-specified range, a signal to the base station, receipt of the signal at the base station causing the base station to initiate a function performed by an apparatus.

14. The one or more non-transitory computer-readable storage media of claim 13, wherein:
the reference input value comprises a reference voltage; and
the logic when executed is further operable to generate the reference voltage at a frequency derived from a frequency of the carrier signal, the generating of the reference voltage being performed by an oscillator of the electronic key.

15. The one or more non-transitory computer-readable storage media of claim 13, wherein the logic when executed is operable to calculate the actual field strength of the carrier signal by performing operations comprising calculating a quotient formed from the output value output from the antenna circuit and an output value resulting from the reference input value being used as the input to the antenna circuit.

16. The one or more non-transitory computer-readable storage media of claim 13, wherein the logic when executed is further operable to determine the function performed by the apparatus based on the distance between the base station and the electronic key.

17. The one or more non-transitory computer-readable storage media of claim 13, wherein:
the antenna is one of a plurality of perpendicular antennas of the electronic key; and
the logic when executed is further operable to:
calculate, for each of the other antennas in the plurality of antennas, a corresponding actual field strength of the carrier signal; and
determine a position of the electronic key relative to the base station through superposition of the actual field strength for the antenna and the corresponding actual field strengths for each of the other antennas in the plurality of antennas.

18. The one or more non-transitory computer-readable storage media of claim 13, wherein the logic is further operable to switch between providing the reference input value and receiving the output value at the antenna circuit.

19. The one or more non-transitory computer-readable storage media of claim 13, wherein the function initiated by the base station is unlocking a motor vehicle.

20. The method of claim 1, further comprising switching, at the antenna circuit, between providing the reference input value and receiving the output value.

21. The method of claim 1, wherein the reference input value comprises one or more of:
a reference voltage; and
a reference current.

22. The electronic key of claim 6, wherein the reference input value comprises one or more of:
a reference voltage; and
a reference current.

23. The one or more non-transitory computer-readable storage media of claim 13, wherein the reference input value comprises one or more of:
a reference voltage; and
a reference current.

* * * * *